United States Patent
Cha

(10) Patent No.: US 11,709,643 B2
(45) Date of Patent: Jul. 25, 2023

(54) PERFORM IMAGE FORMING OPERATIONS BASED ON EMERGENCY

(71) Applicant: HEWLETT-PACKARD DEVELOPMENT COMPANY, L.P., Spring, TX (US)

(72) Inventor: Inhwan Cha, Pangyo (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/599,177

(22) PCT Filed: Sep. 23, 2020

(86) PCT No.: PCT/US2020/052225
§ 371 (c)(1),
(2) Date: Sep. 28, 2021

(87) PCT Pub. No.: WO2021/112941
PCT Pub. Date: Jun. 10, 2021

(65) Prior Publication Data
US 2022/0164151 A1 May 26, 2022

(51) Int. Cl.
*G06F 3/12* (2006.01)

(52) U.S. Cl.
CPC .......... *G06F 3/1263* (2013.01); *G06F 3/1211* (2013.01); *G06F 3/1258* (2013.01); *G06F 3/1287* (2013.01)

(58) Field of Classification Search
CPC .... G06F 3/1263; G06F 3/1215; G06F 3/1208; G06K 15/186

USPC ..... 358/1.1, 1.9, 3.24, 3.26, 3.27, 1.13, 504, 358/518; 382/167
See application file for complete search history.

(56) References Cited

U.S. PATENT DOCUMENTS

| | | | |
|---|---|---|---|
| 2002/0135796 A1* | 9/2002 | Alexander | G06F 3/1292 358/1.15 |
| 2006/0182361 A1* | 8/2006 | Ptucha | H04N 1/60 382/254 |
| 2007/0097449 A1 | 5/2007 | Shibata | |
| 2008/0137117 A1 | 6/2008 | Lee | |
| 2009/0035030 A1 | 2/2009 | Bae et al. | |
| 2010/0118320 A1* | 5/2010 | Hur | H04N 1/506 358/1.9 |

(Continued)

FOREIGN PATENT DOCUMENTS

| | | |
|---|---|---|
| JP | 2006-62279 | 3/2006 |
| JP | 2006-150731 | 6/2006 |
| JP | 2007-55088 | 3/2007 |

(Continued)

*Primary Examiner* — Jamares Q Washington
(74) *Attorney, Agent, or Firm* — Brooks, Cameron & Huebsch, PLLC

(57) ABSTRACT

A method of operating an image forming apparatus includes receiving a request to perform an image forming operation, performing a calibration operation based on obtained urgency level information in response to the request, when a condition to perform a calibration is determined to be satisfied, the urgency level indicating a level of urgency to perform the image forming operation and the calibration is to standardize standardizing color representation of the image to be formed, and performing the image forming operation after the calibration operation is performed.

15 Claims, 13 Drawing Sheets

(56) References Cited

U.S. PATENT DOCUMENTS

2011/0032565 A1     2/2011    Akimoto et al.
2017/0119594 A1     5/2017    Bewick-Sonntag et al.

FOREIGN PATENT DOCUMENTS

| JP | 2008-207486 | 9/2008 |
| JP | 2009-137072 A | 6/2009 |
| JP | 2011-110926 | 6/2011 |

\* cited by examiner

| USER | IMAGE FORMING OPERATION | PRIORITY ORDER |
|---|---|---|
| FIRST USER | AA FILE PRINT OPERATION | High |
| SECOND USER | CCE FILE PRINT OPERATION | Very Low |
| THIRD USER | IAO FILE FAX OPERATION | Middle |
| FOURTH USER | BB FILE PRINT OPERATION | Low |

730

| USER | IMAGE FORMING OPERATION | PRIORITY ORDER | EMERGENCY LEVEL | CALIBRATION MODE |
|---|---|---|---|---|
| FIRST USER | AA FILE PRINT OPERATION | High | High | SKIP MODE |
| THIRD USER | IAO FILE FAX OPERATION | Middle | High | SKIP MODE |
| FOURTH USER | BB FILE PRINT OPERATION | Low | Low | QUICK MODE |
| SECOND USER | CCE FILE PRINT OPERATION | Very Low | None | FULL MODE |

| USER | IMAGE FORMING OPERATION | COMMUNICATION METHOD | PRIORITY ORDER |
|---|---|---|---|
| FIRST USER | AA FILE PRINT OPERATION | Wi-Fi | High |
| SECOND USER | CCE FILE PRINT OPERATION | NFC | Very Low |
| THIRD USER | IAO FILE FAX OPERATION | WIRED | High |
| FOURTH USER | BB FILE PRINT OPERATION | Wi-Fi Direct | Low |

830

| USER | IMAGE FORMING OPERATION | PRIORITY ORDER | EMERGENCY LEVEL | CALIBRATION MODE |
|---|---|---|---|---|
| FIRST USER | AA FILE PRINT OPERATION | High | High | SKIP MODE |
| THIRD USER | IAO FILE FAX OPERATION | High | High | SKIP MODE |
| FOURTH USER | BB FILE PRINT OPERATION | Low | Low | QUICK MODE |
| SECOND USER | CCE FILE PRINT OPERATION | Very Low | None | FULL MODE |

PERFORM IMAGE FORMING OPERATIONS BASED ON EMERGENCY

CROSS REFERENCE TO RELATED APPLICATIONS

This application is a U.S. National Stage Application which claims the benefit under 35 U.S.C. § 371 of International Patent Application No. PCT/US2020/052225 filed on Sep. 23, 2020, which claims priority benefit from Korean Patent Application No. 10-2019-0159111 filed on Dec. 3, 2019, the contents of each of which are incorporated herein by reference.

BACKGROUND

An image forming apparatus performs calibration at certain intervals. When an image forming operation is requested right before an image forming apparatus performs calibration, the image forming apparatus performs the calibration first. For example, calibration may take one to three minutes. After the calibration is completed, the image forming apparatus performs the image forming operation.

BRIEF DESCRIPTION OF DRAWINGS

FIG. 7B is a diagram for describing a process of setting an emergency level based on the priority order of each user requesting an image forming operation and performing a certain calibration mode, according to an example of the present disclosure.

FIG. 8B is a diagram for describing a process of setting an emergency level based on the priority order of a communication method, by which an image forming operation is requested, and performing a certain calibration mode, according to an example of the present disclosure.

DETAILED DESCRIPTION

The term "image forming apparatus" may refer any type of apparatus, such as a printer, a scanner, a fax machine, a multi-function printer (MFP), or a display, which may perform an image forming operation. An "operation performed by an image forming apparatus" may involve printing, copying, scanning, faxing, saving, transmission, or the like.

Examples of the present disclosure will be described in detail hereinafter with reference to the accompanying drawings so as to be easily implemented by one of ordinary skill in the art to which the present disclosure belongs. The present disclosure may, however, be embodied in many different forms and is not limited to the examples set forth herein.

Figure 1:
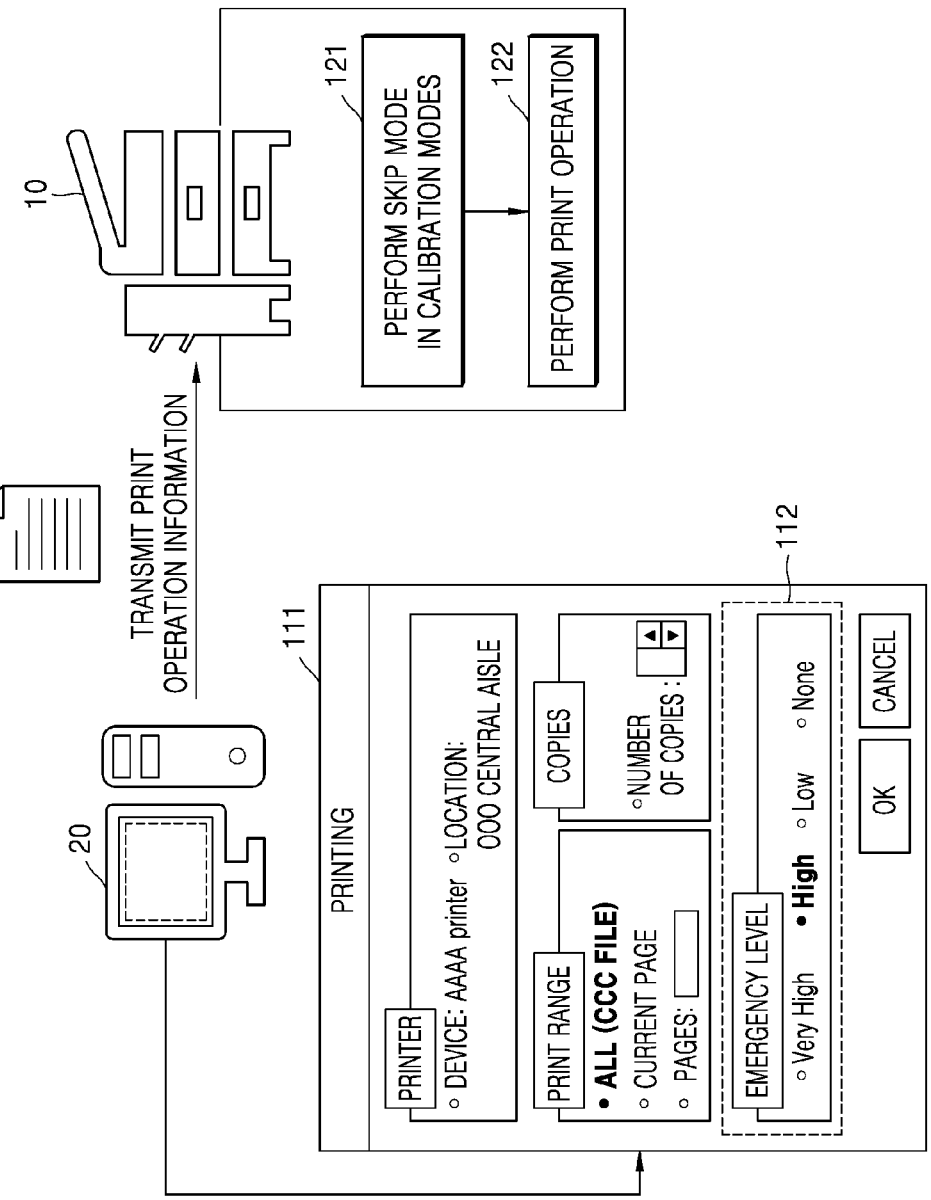
FIG. 1 is a conceptual diagram for describing an operation of performing a calibration operation and an image forming operation according to an emergency level of the image forming operation when an image forming apparatus receives a request for the image forming operation, according to an example of the present disclosure.

FIG. 1 is a conceptual diagram for describing an operation of performing a calibration operation and an image forming operation according to an emergency level of the image forming operation when an image forming apparatus receives a request for the image forming operation, according to an example of the present disclosure.

Referring to FIG. 1, an electronic device 20 may transmit print operation information regarding a file to an image forming apparatus 10. Before the print operation information is transmitted to the image forming apparatus 10, a user may set detailed information about a print operation. The electronic device 20 may display a screen 111 for setting detailed information about a print operation of a file. The screen 111 may include a screen 112 for setting an emergency level for the print operation of the file.

The image forming apparatus 10 may perform calibration for standardizing the color representation of an image at certain intervals. When conditions for performing calibration are satisfied, the image forming apparatus 10 may perform a calibration operation. Accordingly, an image forming operation requested to the image forming apparatus 10 may be delayed due to the calibration operation.

When conditions for performing calibration are satisfied in the image forming apparatus 10, the image forming apparatus 10 may perform a certain calibration mode based on an emergency level of a requested print operation of a file. For example, the emergency level of a print operation of a file is set "High", the image forming apparatus 10 may perform a skip mode in the calibration modes in operation 121. The skip mode of the calibration modes is executed in the image forming apparatus 10, the image forming apparatus 10 may perform the print operation of the file in operation 122.

Figure 2:
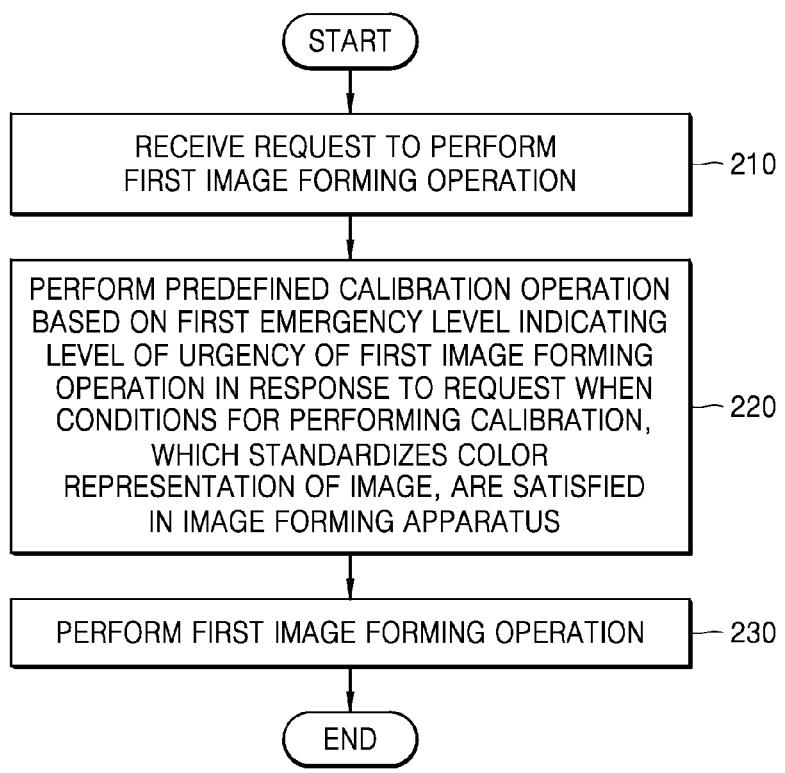
FIG. 2 is a flowchart of a method of performing a calibration operation and an image forming operation according to an emergency level of the image forming operation, according to an example of the present disclosure.

FIG. 2 is a flowchart of a method of performing a calibration operation and an image forming operation according to an emergency level of the image forming operation, according to an example of the present disclosure.

Referring to FIG. 2, the image forming apparatus 10 may receive a request to perform a first image forming operation in operation 210. For example, the first image forming operation may include a print operation, a copy operation, a fax operation, a scan-to-email operation, a scan-to-server message block (SMB) operation, a scan-to-file transfer protocol (FTP) operation, or a scan-to-universal serial bus (USB) operation.

When conditions for performing calibration, which standardizes color representation of an image, are satisfied in the image forming apparatus 10, the image forming apparatus 10 may perform a first calibration operation based on a first emergency level indicating the level of urgency of the first image forming operation in response to the request in operation 220.

For example, calibration may be performed at certain intervals. The certain intervals may be set based on at least one selected from time and the number of copies. Calibration may be set to be performed when a certain image forming operation is requested. For example, a calibration mode may include a full mode in which calibration is precisely performed with respect to all predetermined colors and a quick mode in which calibration is performed with respect to a certain color.

For example, the emergency level may be set to one of four levels. In detail, the emergency level may be classified as a first level indicating a highest emergency, a second level indicating a high emergency, a third level indicating a low emergency, or a fourth level indicating a lowest emergency or a state in which no emergency level is set. For example, in the image forming apparatus 10 or a user's electronic device, the first level may be displayed as "Very High", the second level may be displayed as "High", the third level may be displayed as "Low", and the fourth level may be displayed as "Very Low".

In another example, the emergency level may be set to one of five levels. In detail, the emergency level may be classified as a first level indicating a highest emergency, a second level indicating a high emergency, a third level indicating a middle emergency, a fourth level indicating a low emergency, or a fifth level indicating a lowest emergency or a state in which no emergency level is set. For example, in the image forming apparatus 10 or a user's electronic device, the first level may be displayed as "Very High", the second level may be displayed as "High", the third level may be displayed as "Middle", the fourth level may be displayed as "Low", and the fifth level may be displayed as "Very Low".

In another example, the state in which no emergency level is set may be displayed as "None".

For example, the image forming apparatus 10 may receive input level information, which sets an emergency level for an image forming operation, when receiving a request to perform the image forming operation. For example, when there is a first file to be immediately output by a user, an electronic device may receive input level information that sets an emergency level for the print operation of the first file to "Very High".

For example, the image forming apparatus 10 may perform a predefined calibration operation corresponding to an emergency level for an image forming operation. For example, the predefined calibration operation may be set such that a calibration operation time decreases as an emergency of an image forming operation increases. The predefined calibration operation may be classified as a skip mode in which a calibration operation is skipped, a quick mode in which a predefined partial operation of the entire calibration operation is performed, or a full mode in which the entire calibration operation is performed, according to the emergency level of an image forming operation.

For example, when a first emergency level is set to be in a high emergency range, the image forming apparatus 10 may perform the skip mode in the calibration modes. For example, the high emergency range may include a "Very High" level and a "High" level.

For example, when the first emergency level is set to be in a low emergency range, the image forming apparatus 10 may perform the quick mode in which a predefined partial operation of the entire calibration operation is performed. For example, the low emergency range may include a "Middle" level and a "Low" level.

For example, when the first emergency level is set to be in a lowest emergency range or when no emergency level is set, the image forming apparatus 10 may perform the full mode in which the entire calibration operation is performed. For example, the lowest emergency range may include a "Very Low" level. A state in which no emergency level is set may include a "None" level.

For example, the image forming apparatus 10 may receive input level information, which sets an emergency level for a first image forming operation among a plurality of predefined emergency levels, or information for modifying an emergency level based on a user's authority information from an external device or a user interface device thereof. This example will be described with reference to FIGS. 4 and 5.

For example, the image forming apparatus 10 may set an emergency level based on the number of times that a physical button of the image forming apparatus 10 is pressed. For example, the image forming apparatus 10 may set an emergency level to "High" for a certain image forming operation when a certain button of the image forming apparatus 10 is pressed at least a certain number of times.

For example, when a reference emergency level set in the image forming apparatus 10 is different from a first emergency level set according to a user input requesting a first image forming operation, the image forming apparatus 10 may set an emergency level according to a certain criterion.

For example, the image forming apparatus 10 may set, as the emergency level, a higher one between the reference emergency level and the first emergency level. The image forming apparatus 10 may set the reference emergency level as the emergency level by giving priority to the reference emergency level over the first emergency level. The image forming apparatus 10 may set the first emergency level as the emergency level by giving priority to the first emergency level over the reference emergency level. This example will be described with reference to FIG. 6.

For example, the image forming apparatus 10 may set the first emergency level for the first image forming operation based on at least one selected from the predefined priority order of users, the predefined priority order of communication methods by which image forming operations are requested, and the predefined priority order of Internet protocol (IP) addresses for which image forming operations are requested. This example will be described with reference to FIGS. 7A through 8B.

For example, the image forming apparatus 10 may perform a first calibration operation corresponding to the first emergency level according to the priority order of the first image forming operation.

When a color image including a plurality of colors is printed without performing calibration, the colors of a printed color image may not reflect the colors of the original color image, and colors may not be properly aligned. Accordingly, the image forming apparatus 10 may set an emergency level for an image forming operation, taking into account characteristics of the image forming operation, and may perform a calibration mode corresponding to the emergency level.

For example, the image forming apparatus 10 may set the first emergency level for the first image forming operation based on at least one selected from the kind of the first image forming operation, a format of a file requested for the first image forming operation, a color of text included in data of the first image forming operation, and a color of an image included in the data. This example will be described with reference to FIG. 9.

For example, the image forming apparatus 10 may set the first emergency level for the first image forming operation to a certain level or a higher level when a plurality of images are included in the data of the first image forming operation or when at least two color forming operations are requested for the first image forming operation.

For example, when receiving a request to perform the first image forming operation, the image forming apparatus 10 may display information about whether to perform calibration and information about estimated time of completion of the first image forming operation or may transmit the information to an external device that has requested to perform the first image forming operation. The estimated time of completion of the first image forming operation may be the sum of a waiting time caused by performing the first calibration operation and an image forming operation time. This example will be described with reference to FIG. 10.

The image forming apparatus 10 may perform the first image forming operation after the first calibration operation is performed, in operation 230.

Figure 3:
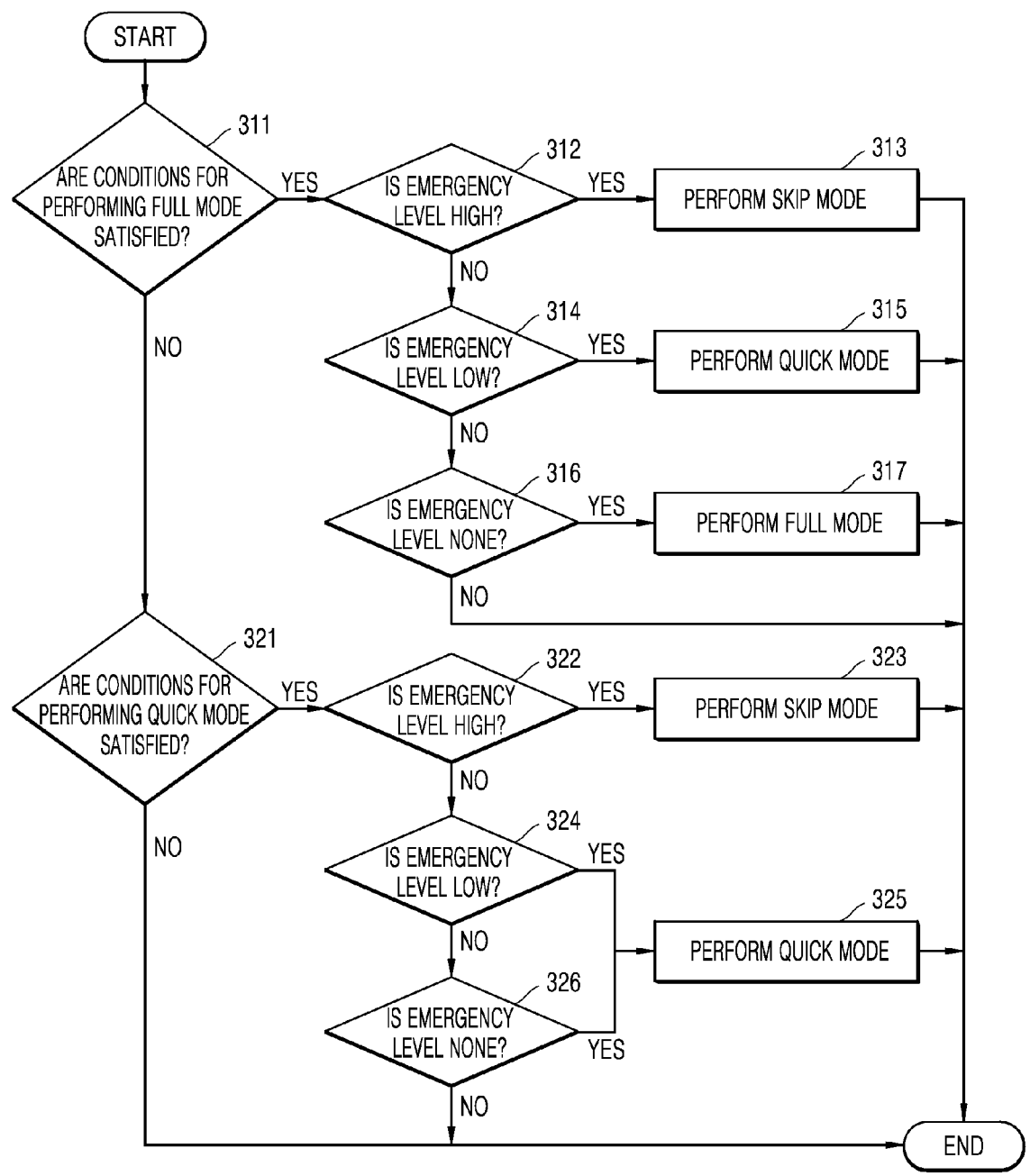
FIG. 3 is a flowchart of a method of performing a calibration mode based on an emergency level when certain conditions for performing calibration are satisfied, according to an example of the present disclosure.

FIG. 3 is a flowchart of a method of performing a calibration mode based on an emergency level when certain conditions for performing calibration are satisfied, according to an example of the present disclosure.

Referring to FIG. 3, the image forming apparatus 10 may identify whether conditions for performing a full mode in the calibration modes are satisfied in the image forming apparatus 10 in operation 311. When the conditions for performing the full mode in the calibration modes are satisfied in the image forming apparatus 10, the image forming apparatus 10 may perform a certain calibration mode based on an emergency level of an image forming operation.

In detail, the image forming apparatus 10 may identify whether the emergency level is high in operation 312. When the emergency level is high, the image forming apparatus 10 may perform a skip mode in the calibration modes, in operation 313. Otherwise, when the emergency level is not high, the image forming apparatus 10 may identify whether the emergency level is low in operation 314. When the emergency level is low, the image forming apparatus 10 may perform a quick mode in the calibration modes, in operation 315. Otherwise, when the emergency level is not low, the image forming apparatus 10 may identify whether the emergency level is none in operation 316. When the emergency level is none, the image forming apparatus 10 may perform the full mode in the calibration modes, in operation 317.

When the conditions for performing the full mode in the calibration modes are not satisfied in the image forming apparatus 10, the image forming apparatus 10 may identify whether conditions for performing the quick mode in the calibration modes are satisfied in operation 321. Otherwise, when the conditions for performing the quick mode in the calibration modes are satisfied, the image forming apparatus 10 may perform a certain calibration mode based on the emergency level of the image forming operation.

In detail, the image forming apparatus 10 may identify whether the emergency level is high in operation 322. When the emergency level is high, the image forming apparatus 10 may perform the skip mode in the calibration modes, in operation 323. Otherwise, when the emergency level is not high, the image forming apparatus 10 may identify whether the emergency level is low in operation 324. When the emergency level is low, the image forming apparatus 10 may perform the quick mode in the calibration modes, in operation 325. Otherwise, when the emergency level is not low, the image forming apparatus 10 may identify whether the emergency level is none in operation 326. When the emergency level is none, the image forming apparatus 10 may perform the quick mode in the calibration modes in operation 325.

Figure 4:
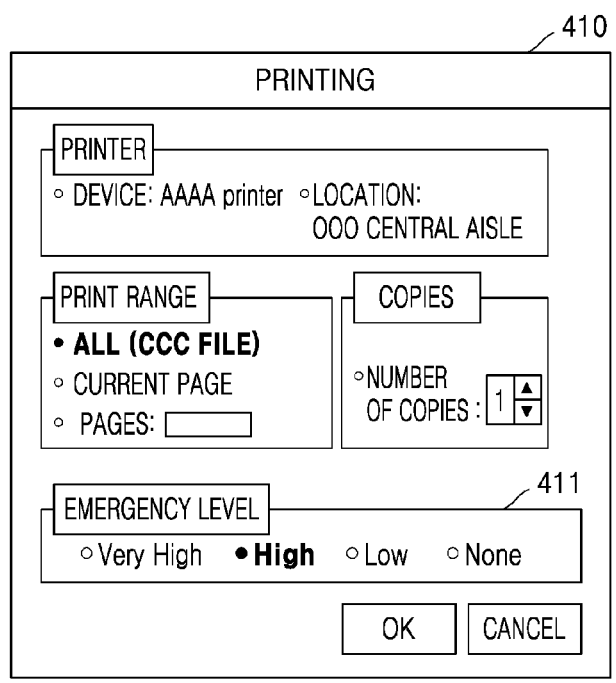
FIG. 4 is a diagram for describing a screen for inputting information for setting an emergency level of an image forming operation, according to an example of the present disclosure.

FIG. 4 is a diagram for describing a screen for inputting information for setting an emergency level of an image forming operation, according to an example of the present disclosure.

A user's electronic device may transmit information for requesting to print a first file to the image forming apparatus 10. Before the information for requesting to print the first file is transmitted to the image forming apparatus 10, the user may set an emergency level for a print operation of the first file. For example, the electronic device may display a screen 410 for setting detailed information about the print operation of the first file. The screen 410 may include information about the image forming apparatus 10, information about a print range of the first file, information about the number of copies of the first file, and emergency level information 411 of the first file.

The electronic device may receive at least one selected from the information about a print range of the first file, the information about the number of copies of the first file, and the emergency level information 411 of the first file through the screen 410. For example, when the printing of the first file is urgently requested, the user may select "High" for the emergency level of the print operation of the first file on the screen 410. When the input of detailed information is completed on the screen 410, as shown in FIG. 4, the electronic device may transmit the information, in which the emergency level of the print operation of the first file is set to "High", to the image forming apparatus 10.

Although the screen 410 of FIG. 4 has been described as an example displayed on a user's electronic device, the screen 410 may be displayed on a user interface device of the image forming apparatus 10. For example, the image forming apparatus 10 may receive a print command with respect to the first file stored therein. The image forming apparatus 10 may display the screen 410 for setting detailed information about the print operation of the first file. The image forming apparatus 10 may receive an input for setting the emergency level of the print operation of the first file to "High".

Figure 5:
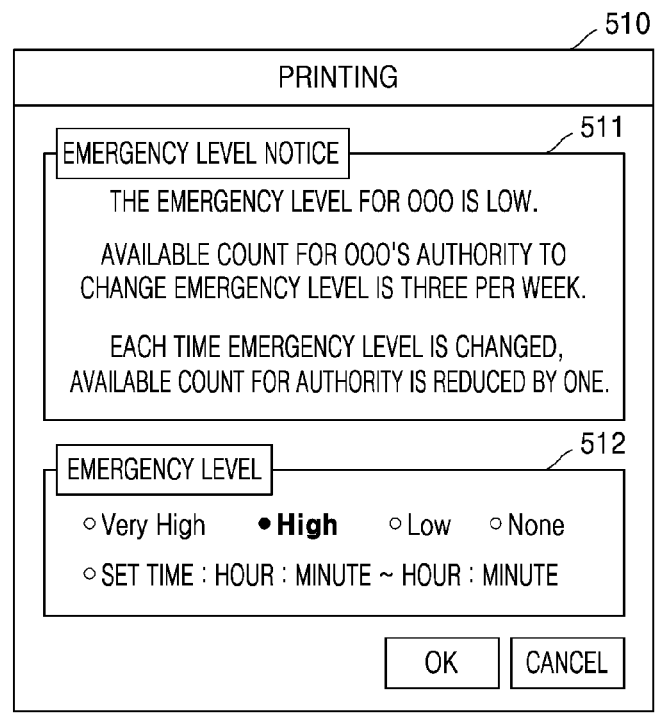
FIG. 5 is a diagram for describing a screen for inputting information for setting an emergency level of an image forming operation based on a user's authority, according to an example of the present disclosure.

FIG. 5 is a diagram for describing a screen for inputting information for setting an emergency level of an image forming operation based on a user's authority, according to an example of the present disclosure.

An electronic device may display a screen 510 for setting an emergency level for a print operation of a first file according to a users request to print the first file. For example, the screen 510 may include emergency level notice information and emergency level setting information.

For example, when an emergency level for a user is set to low, an emergency level of an image forming operation requested by the user may be set to low. However, when a user is authorized to change an emergency level, the user may change an emergency level for the user based on authority information.

For example, when an emergency level for a user is set to low, an electronic device may display emergency level notice information 511 reading "The emergency level for OOO is low. Available count for OOO's authority to change the emergency level is three per week. Each time the emergency level is changed, the available count for the authority is reduced by one." The electronic device may receive information 512 for changing an emergency level and setting a time during which the changed emergency level is effective, based on a users authority information.

When users of the image forming apparatus 10 are authorized to set an emergency level to high, calibration may not be normally performed, and therefore, a manager of the image forming apparatus 10 may differently set authority to change the emergency level for each user or each user group.

Although the screen 510 of FIG. 5 has been described as an example displayed on a user's electronic device, the screen 510 may be displayed on a user interface device of the image forming apparatus 10. For example, when the image forming apparatus 10 receives a print command with respect to a first file stored therein, the image forming apparatus 10 may display the screen 510 for setting an emergency level for a print operation of the first file based on a user's authority information.

Figure 6:
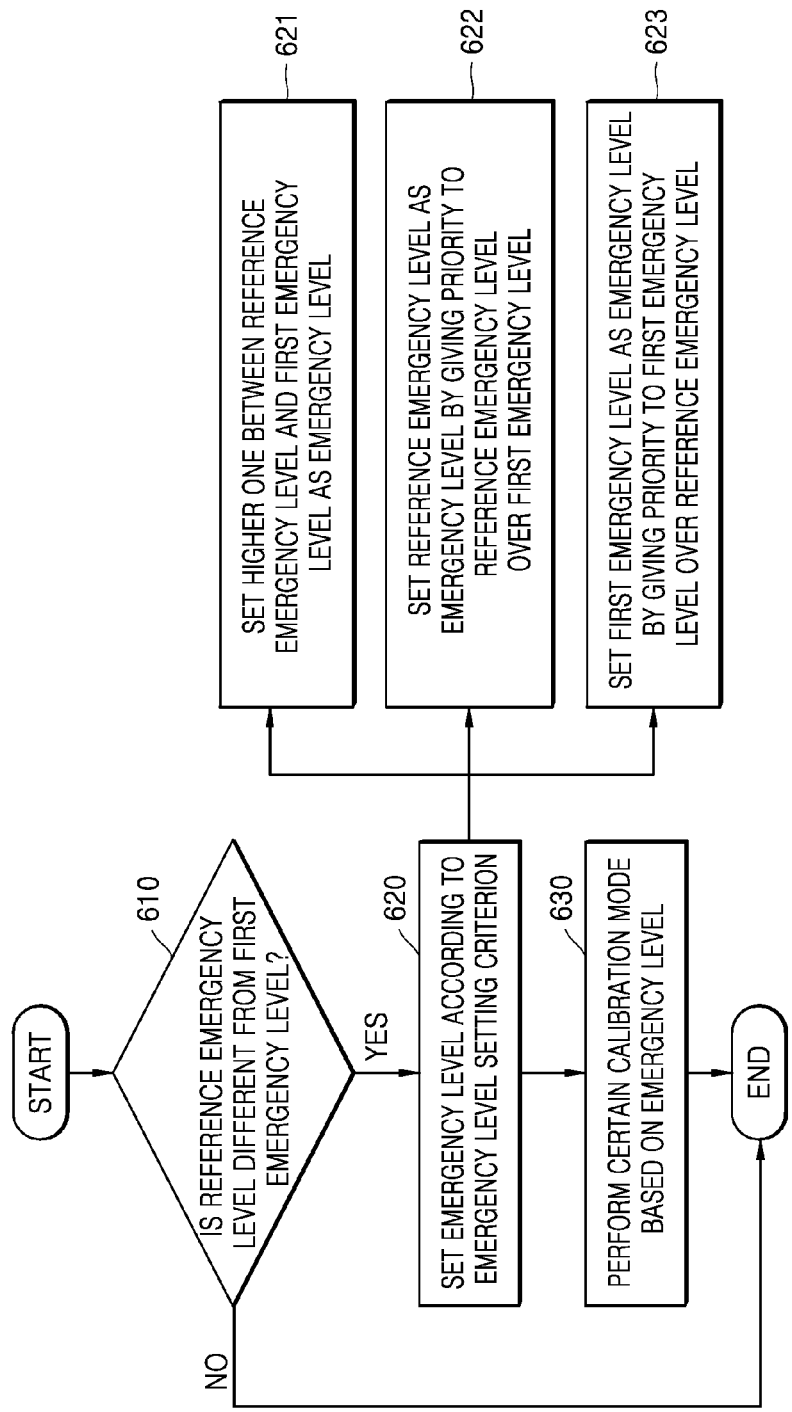
FIG. 6 is a diagram for describing a process of setting an emergency level when a reference emergency level preset in an image forming apparatus is different from an emergency level set according to a user's input information, according to an example of the present disclosure.

FIG. 6 is a diagram for describing a process of setting an emergency level when a reference emergency level preset in an image forming apparatus is different from an emergency level set according to a user's input information, according to an example of the present disclosure.

Referring to FIG. 6, the image forming apparatus 10 may identify whether a reference emergency level preset in the image forming apparatus 10 is different from a first emergency level set according to a user's input information in operation 610. When the reference emergency level is different from the first emergency level, the image forming apparatus 10 may set an emergency level according to a criterion for setting an emergency level.

In detail, for example, the image forming apparatus 10 may set a higher one between the reference emergency level and the first emergency level as the emergency level according to a first criterion of setting a higher one between a reference emergency level preset in the image forming apparatus 10 and an emergency level set according to a user's input information in operation 621.

For example, the image forming apparatus 10 may set the reference emergency level as the emergency level based on a second criterion of giving priority to a reference emergency level preset in the image forming apparatus 10 over an emergency level set according to a user's input information in operation 622.

For example, the image forming apparatus 10 may set the first emergency level as the emergency level based on a third criterion of giving priority to an emergency level set according to a user's input information over a reference emergency level preset in the image forming apparatus 10 in operation 623.

The image forming apparatus 10 may perform a certain calibration mode based on the emergency level in operation 630. For example, when the emergency level is "High", the image forming apparatus 10 may perform a skip mode in the calibration modes. For example, when the emergency level is "Low", the image forming apparatus 10 may perform a quick mode in the calibration modes. For example, when the emergency level is "None", the image forming apparatus 10 may perform a full mode in the calibration modes.

Figure 7A:
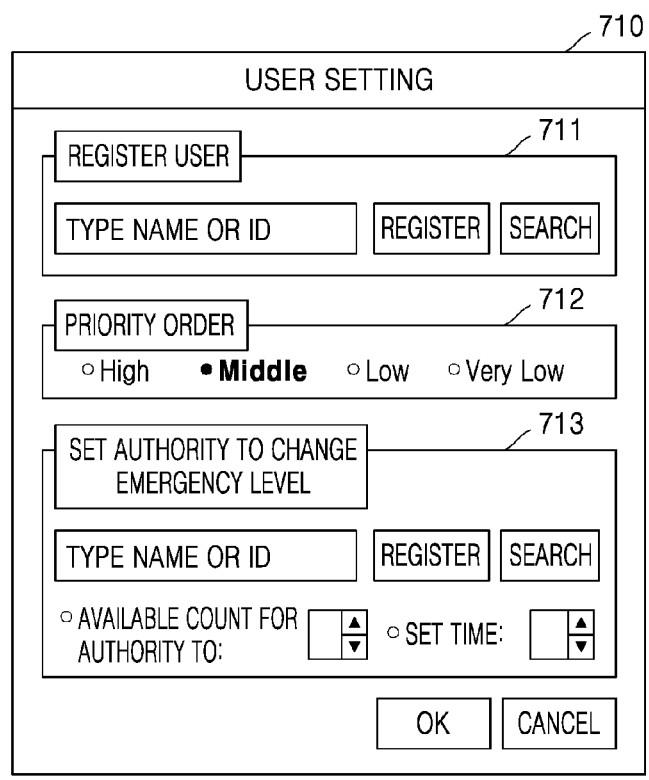
FIG. 7A is a diagram for describing a screen for setting the priority order of each user and authority to change an emergency level, according to an example of the present disclosure.

FIG. 7A is a diagram for describing a screen for setting the priority order of each user and authority to change an emergency level, according to an example of the present disclosure.

A manager of the image forming apparatus 10 may set the priority order of users and authority to change an emergency level. The image forming apparatus 10 may set an emergency level of an image forming operation requested by a user based on the set priority order of users and the set authority to change the emergency level.

As shown in FIG. 7A, a management device may display a screen 710 for setting the priority order of each user and authority to change an emergency level. The screen 710 may include a screen 711 for inputting registration information of a user, a screen 712 for inputting information about the priority order of a user, and a screen 713 for inputting information about authority to change an emergency level.

For example, the management device may receive information about the name or identification (ID) of a user through the screen 711 and may receive information for setting the priority order of the user to "Middle" through the screen 712. The management device may receive information about the name or ID of a group through the screen 711 and may receive information for setting the priority order of the group through the screen 712.

For example, the management device may receive information for setting an available count for a user's authority to change an emergency level and for setting the effective time of the emergency level through the screen 713.

The management device may transmit information for setting the priority order of each user and authority to change an emergency level, which is received through the screen 710, to the image forming apparatus 10 or a server managing the image forming apparatus 10. The image forming apparatus 10 may store information about the priority order of the user and information about the authority to change the emergency level based on the information received from the management device.

Although it has been described that the screen 710 of FIG. 7A is displayed on a manager's management device, the screen 710 may be displayed on a user interface device of the image forming apparatus 10. For example, the manager may log in with a manager account in the image forming apparatus 10. The image forming apparatus 10 may display the screen 710 for setting the priority order of each user and setting authority to change an emergency level.

FIG. 7B is a diagram for describing a process of setting an emergency level based on the priority order of each user requesting an image forming operation and performing a certain calibration mode, according to an example of the present disclosure.

Referring to a table 720 in FIG. 7B, when certain conditions for performing calibration are satisfied in the image forming apparatus 10, the image forming apparatus 10 may receive requests to perform an image forming operation from a plurality of users. The priority order of the users may be preset. For example, the priority order of a first user may be set to "High", the priority order of a second user may be set to "Very Low", the priority order of a third user may be set to "Middle", and the priority order of a fourth user may be set to "Low".

Referring to a table 730 in FIG. 7B, the image forming apparatus 10 may set an emergency level of each image forming operation based on the priority order of the users. For example, the image forming apparatus 10 may set an emergency level of an image forming operation to "High" for a user having the priority order set to "High" or "Middle". The image forming apparatus 10 may set an emergency level of an image forming operation to "Low" for a user having the priority order set to "Low". The image forming apparatus 10 may set an emergency level of an image forming operation to "None" for a user having the priority order set to "Very Low".

Referring to the table 730 in FIG. 7B, the image forming apparatus 10 may perform a calibration mode based on an emergency level of an image forming operation before performing the image forming operation according to the priority order of a user. For example, the image forming apparatus 10 may set an emergency level of an "AA file print operation" requested by the first user to "High" and perform a skip mode in the calibration modes. The image forming apparatus 10 may set an emergency level of an "IAO file fax operation" requested by the third user to "High" and perform the skip mode in the calibration modes.

The image forming apparatus 10 may set an emergency level of a "B file print operation" requested by the fourth user to "Low" and perform a quick mode in the calibration modes. The image forming apparatus 10 may set an emergency level of a "CCE file print operation" requested by the second user to "None" and perform a full mode in the calibration modes.

Figure 8A:
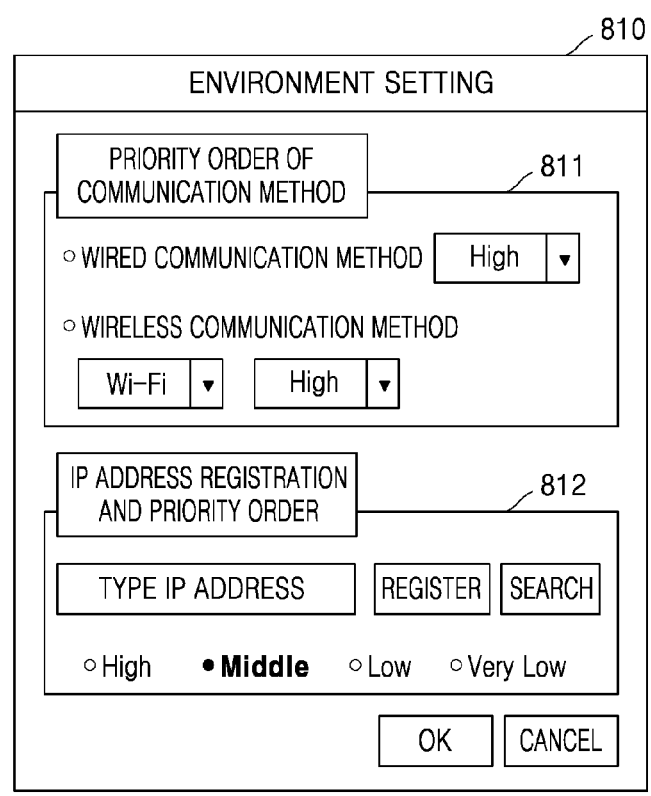
FIG. 8A is a diagram for describing a screen for setting the priority order of a communication method or an IP address, according to an example of the present disclosure.

FIG. 8A is a diagram for describing a screen for setting the priority order of a communication method or an IP address, according to an example of the present disclosure.

A manager of the image forming apparatus 10 may set the priority order of a communication method, which is used when an external device requests the image forming apparatus 10 to perform an image forming operation, and the priority order of an IP address. The image forming apparatus 10 may set an emergency level of an image forming operation requested by a user, based on the priority order of a communication method and the priority order of an IP address, which are set by the manager.

As show in FIG. 8A, a management device may display a screen 810 for setting the priority order of a communication method and the priority order of an IP address. The screen 810 may include a screen 811 for inputting information about the priority order of a communication method and a screen 812 for inputting information about the priority order of an IP address.

For example, the management device may receive information for setting the priority order of a wired or wireless communication method through the screen 811. For example, the management device may receive an input for setting the priority order of a wired communication method to "High". The management device may receive an input selecting a first wireless communication method among a plurality of wireless communication methods and an input for setting the priority order of the first wireless communication method. For example, the management device may receive an input for setting the priority order of Wi-Fi to "High".

The management device may receive information for registering an IP address and setting the priority order of the IP address through the screen 812. For example, the management device may receive information for setting the priority order of IP address 192.168.10.XX.XXX to "Middle".

The management device may transmit the information for setting the priority order of a communication method and the priority order of an IP address, which is received through the screen 810, to the image forming apparatus 10 or a server managing the image forming apparatus 10. The image forming apparatus 10 may store information about the priority order of a communication method and the priority order of an IP address therein based on information received from the management device.

Although it has been described that the screen 810 of FIG. 8A is displayed on a manager's management device, the screen 810 may be displayed on a user interface device of the image forming apparatus 10. For example, the manager may log in with a manager account in the image forming apparatus 10. The image forming apparatus 10 may display the screen 810 for setting the priority order of a communication method and the priority order of an IP address.

FIG. 8B is a diagram for describing a process of setting an emergency level based on the priority order of a communication method, by which an image forming operation is requested, and performing a certain calibration mode, according to an example of the present disclosure.

Referring to a table 820 in FIG. 8B, when certain conditions for performing calibration are satisfied in the image forming apparatus 10, the image forming apparatus 10 may receive requests to perform an image forming operation from a plurality of users. At this time, communication methods used when electronic devices of the respective users respectively request the image forming apparatus 10 to perform image forming operations may be different from each other. The priority order of the communication methods may be preset. For example, the priority order of Wi-Fi may be set to "High", the priority order of near field communication (NFC) may be set to "Very Low", the priority order of wired communication may be set to "High", and the priority order of Wi-Fi Direct may be set to "Low".

Referring to a table 830 in FIG. 8B, the image forming apparatus 10 may set an emergency level of each image forming operation based on the priority order of the communication methods. For example, the image forming apparatus 10 may set an emergency level of an image forming operation to "High" for a communication method having the priority order set to "High" or "Middle". The image forming apparatus 10 may set an emergency level of an image forming operation to "Low" for a communication method having the priority order set to "Low". The image forming apparatus 10 may set an emergency level of an image forming operation to "None" for a communication method having the priority order set to "Very Low".

Referring to the table 830 in FIG. 8B, the image forming apparatus 10 may perform a calibration mode based on an emergency level of an image forming operation before performing the image forming operation according to the priority order of a communication method. For example, the image forming apparatus 10 may set an emergency level of an "AA file print operation" requested by a first user to "High" and perform a skip mode in the calibration modes. The image forming apparatus 10 may set an emergency level of an "IAO file fax operation" requested by a third user to "High" and perform the skip mode in the calibration modes.

The image forming apparatus 10 may set an emergency level of a "B file print operation" requested by a fourth user to "Low" and perform a quick mode in the calibration modes. The image forming apparatus 10 may set an emergency level of a "CCE file print operation" requested by a second user to "None" and perform a full mode in the calibration modes.

Figure 9:
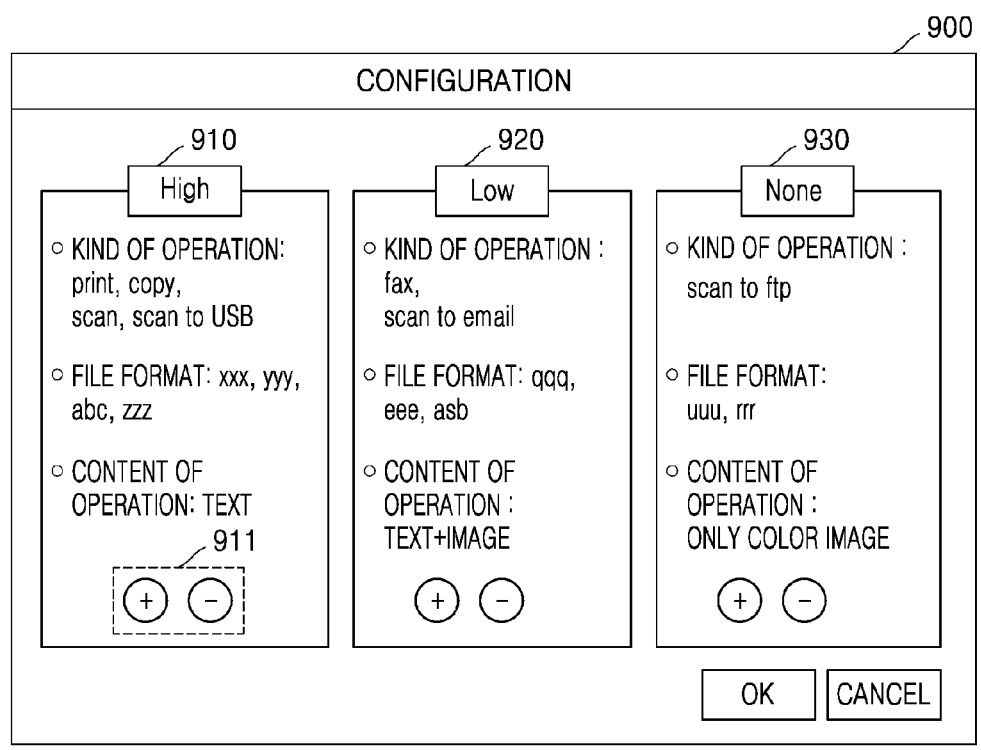
FIG. 9 is a diagram for describing a screen for describing emergency levels based on the kinds of image forming operations, file formats, and contents, according to an example of the present disclosure.

FIG. 9 is a diagram for describing a screen for describing emergency levels based on the kinds of image forming operations, file formats, and contents, according to an example of the present disclosure.

A management device may display a screen 900 for setting an emergency level of an image forming operation according to the kind of the image forming operation, the format of a file requested for the image forming operation, and the content of the image forming operation. The screen 900 may include a screen 910 for setting information of an image forming operation to be set to a "High" level, a screen 920 for setting information of an image forming operation to be set to a "Low" level, and a screen 930 for setting information of an image forming operation to be set to a "None" level.

As shown in the screens 910, 920, and 930, the information of an image forming operation may include information about the kind of the image forming operation, information about the format of a file to undergo the image forming operation, and information about the content of the image forming operation.

For example, the management device may receive information for setting an emergency level of an image forming operation such as a print operation, a copy operation, a scan operation, or a scan-to-USB operation to "High", information for setting an emergency level of an image forming operations having a file format such as xxx, yyy, abc, or zzz to "High", and information for setting an emergency level of an image forming operation, of which the data includes a form of text, to "High" through the screen 910. The screen 910 may include an icon 911 for adding or deleting information about the kind of the image forming operation, the format of a file to undergo the image forming operation, and the content of the image forming operation.

For example, the management device may receive information for setting an emergency level of an image forming operation such as a fax operation or a scan-to-email operation to "Low", information for setting an emergency level of an image forming operation having a file format such as qqq, eee, or asb to "Low", and information for setting an emergency level of an image forming operation, of which the data includes a form of text and a form of an image, to "Low" through the screen 920.

For example, the management device may receive information for setting an emergency level of an image forming operation such as a scan-to-FTP operation to "None", information for setting an emergency level of an image forming operation having a file format such as uuu or rrr to "None", and information for setting an emergency level of an image forming operation, of which the data includes a form of a color image, to "Low" through the screen 920.

The management device may transmit information for setting an emergency level of an image forming operation according to the kinds of image forming operations, the formats of files requested for an image forming operation, and the contents of an image forming operation, which are received through the screen 900, to the image forming apparatus 10 or a server managing the image forming apparatus 10. The image forming apparatus 10 may store information for setting an emergency level based on the kinds of image forming operations, file formats, and contents based on the information received from the management device.

According to the information set in FIG. 9, when an image forming operation is an operation of printing a file having a color image, an emergency level of the image forming operation may be "High" or "None". For example, the image forming apparatus 10 may give priority to a lower level and set the emergency level of the image forming operation to "None". In other words, when an image forming operation may be set to different emergency levels, the image forming apparatus 10 may give priority to a lower level and set the emergency level of the image forming operation to the lower level.

In another example, the image forming apparatus 10 may give priority to a higher level and set the emergency level of the image forming operation to "High".

Although it has been described that the screen 900 of FIG. 9 is displayed on a manager's management device, the screen 900 may be displayed on a user interface device of the image forming apparatus 10. For example, the manager may log in with a manager account in the image forming apparatus 10. The image forming apparatus 10 may display the screen 900 for setting an emergency level of an image forming operation according to the kind of the image forming operation, the format of a file requested for the image forming operation, and the content of the image forming operation.

Figure 10:
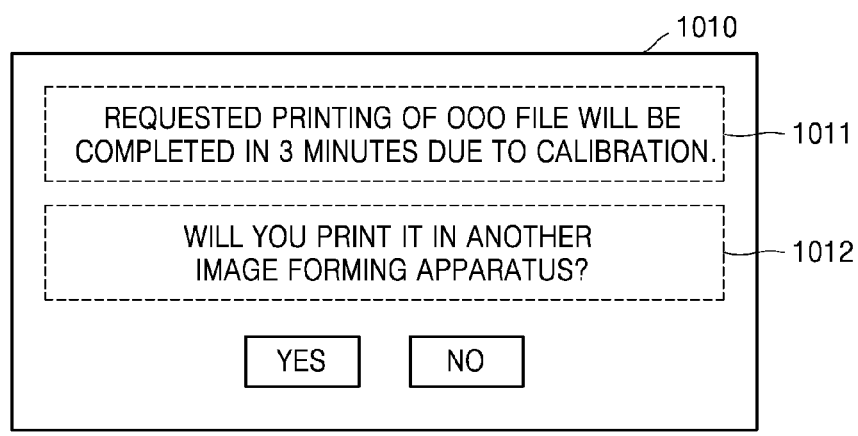
FIG. 10 is a diagram for describing a screen that displays information about estimated time of completion of an image forming operation based on calibration operation, according to an example of the present disclosure.

FIG. 10 is a diagram for describing a screen that displays information about estimated time of completion of an image forming operation based on calibration operation, according to an example of the present disclosure.

When the image forming apparatus 10 receives a request to perform a first image forming operation, the image forming apparatus 10 may display information about whether calibration is performed and information about estimated time of completion of the first image forming operation or may transmit the information to an electronic device that has requested the first image forming operation.

For example, as shown in a screen 1010 of FIG. 10, the electronic device may display information 1011 about estimated time of completion of the first image forming operation, wherein the information 1011 reads "Requested printing of OOO file will be completed in 3 minutes due to calibration". When calibration is performed, the electronic device may display information 1012 asking whether to perform the first image forming operation in another image forming apparatus 10. When the electronic device receives an input selecting "Yes", the electronic device may send a request for the first image forming operation to another image forming apparatus 10 than the image forming apparatus 10 that has been currently requested to perform the first image forming operation.

Although it has been described that the screen 1010 of FIG. 10 is displayed on a user's electronic device, the screen 1010 may be displayed on a user interface device of the image forming apparatus 10.

Figure 11:
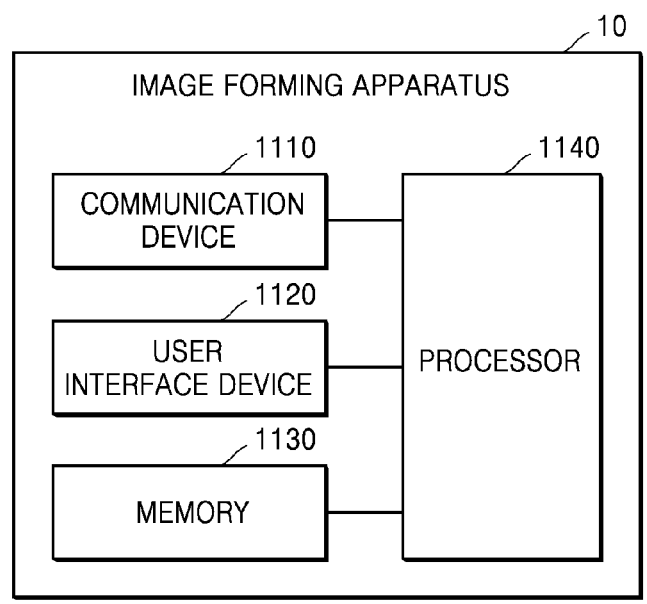
FIG. 11 is a block diagram illustrating the configuration of an image forming apparatus, according to an example of the present disclosure.

FIG. 11 is a block diagram illustrating the configuration of an image forming apparatus, according to an example of the present disclosure.

Referring to FIG. 11, the image forming apparatus 10 may include a communication device 1110, a user interface device 1120, a memory 1130, and a processor 1140. The image forming apparatus 10 may include some or all of these elements. The image forming apparatus 10 may be implemented with more or fewer elements than those shown in FIG. 11. Hereinafter, these elements will be described.

The communication device 1110 may communicate with external devices. In detail, the communication device 1110 may communicate with external devices via wired or wireless connection to a network. Here, the external devices may include an external server managing the image forming apparatus 10 and an electronic device requesting the image forming apparatus 10 to perform a certain operation. The communication device 1110 may include a communication module supporting one of various wired/wireless communication methods. For example, the communication module may include a short-range communication module or a wired communication module.

The user interface device 1120 may include an input unit, which receives an input for controlling the operation of the image forming apparatus 10 from a user, and an output unit, which displays a result of the operation of the image forming apparatus 10 or information such as a state of the image forming apparatus 10. For example, the user interface device 1120 may include an operation panel receiving a user input and a display panel displaying a screen.

For example, the input unit may include, for example, devices, such as a keyboard, a physical button, a touch screen, a camera, and a microphone, which receive various types of user inputs. The output unit may include, for example, a display panel or a speaker. However, examples are not limited thereto, and the user interface device 1120 may include various devices that support input/output.

The memory 1130 may store machine readable instructions or programs. The memory 1130 may store at least one program, which is used to perform a certain calibration operation based on an emergency level of an image forming operation and perform the image forming operation when the image forming operation is requested and conditions for performing calibration are satisfied.

The processor 1140 may execute the program stored in the memory 1130, read data or a file from the memory 1130, or store a new file in the memory 1130. The processor 1140 may execute instructions stored in the memory 1130.

The processor 1140 may receive a request to perform a first image forming operation from an external device through the communication device 1110 or may receive a request to perform a first image forming operation through the user interface device 1120. For example, the first image forming operation may include a print operation, a copy operation, a fax operation, a scan-to-email operation, a scan-to-SMB operation, a scan-to-FTP operation, or a scan-to-USB operation.

When conditions for performing calibration, which standardizes color representation of an image, are satisfied in the image forming apparatus 10, the processor 1140 may perform a first calibration operation based on a first emergency level indicating a level of urgency of the first image forming operation in response to the request.

For example, calibration may be performed at certain intervals. The certain intervals may be set based on at least one selected from time and the number of copies. Calibration may be set to be performed when a certain image forming operation is requested. For example, a calibration mode may include a full mode in which calibration is precisely performed with respect to all predetermined colors and a quick mode in which calibration is performed with respect to a certain color.

For example, the emergency level may be set to one of four levels. In detail, the emergency level may be classified as a first level indicating a highest emergency, a second level indicating a high emergency, a third level indicating a low emergency, or a fourth level indicating a lowest emergency or a state in which no emergency level is set. For example, in the image forming apparatus 10 or a user's electronic device, the first level may be displayed as "Very High", the second level may be displayed as "High", the third level may be displayed as "Low", and the fourth level may be displayed as "Very Low".

In another example, the emergency level may be set to one of five levels. In detail, the emergency level may be classified as a first level indicating a highest emergency, a second level indicating a high emergency, a third level indicating a middle emergency, a fourth level indicating a low emergency, or a fifth level indicating a lowest emergency or a state in which no emergency level is set. For example, in the image forming apparatus 10 or a users electronic device, the first level may be displayed as "Very High", the second level may be displayed as "High", the third level may be displayed as "Middle", the fourth level may be displayed as "Low", and the fifth level may be displayed as "Very Low".

In another example, the state in which no emergency level is set may be displayed as "None".

For example, the communication device 1110 may receive input level information, which sets an emergency level for an image forming operation, when receiving a request to perform the image forming operation. For example, when there is a first file to be immediately copied by a user, the user interface device 1120 may receive input level information that sets an emergency level for the copy operation of the first file to "Very High".

For example, the processor 1140 may perform a predefined calibration operation corresponding to an emergency level for an image forming operation. For example, the predefined calibration operation may be set such that a calibration operation time decreases as the emergency of an image forming operation increases. The predefined calibration operation may be classified as a skip mode in which a calibration operation is skipped, a quick mode in which a predefined partial operation of the entire calibration operation is performed, or a full mode in which the entire calibration operation is performed, according to the emergency of an image forming operation.

For example, when a first emergency level is set to be in a high emergency range, the processor 1140 may perform the skip mode in the calibration modes. For example, the high emergency range may include a "Very High" level and a "High" level.

For example, when the first emergency level is set to be in a low emergency range, the processor 1140 may perform the quick mode in which a predefined partial operation of the entire calibration operation is performed. For example, the low emergency range may include a "Middle" level and a "Low" level.

For example, when the first emergency level is set to be in a lowest emergency range or when no emergency level is set, the processor 1140 may perform the full mode in which the entire calibration operation is performed. For example, the lowest emergency range may include a "Very Low" level. A state in which no emergency level is set may include a "None" level.

For example, the processor 1140 may receive input level information, which sets an emergency level for a first image forming operation among a plurality of predefined emergency levels, or information for modifying an emergency level based on a user's authority information from an external device or the user interface device 1120 of the image forming apparatus 10.

For example, the processor 1140 may set an emergency level based on the number of times that a physical button of the image forming apparatus 10 is pressed. For example, the processor 1140 may set an emergency level to "High" for a certain image forming operation when a certain button of the image forming apparatus 10 is pressed at least a certain number of times.

For example, when a reference emergency level preset in the image forming apparatus 10 is different from a first emergency level set according to a user input requesting a first image forming operation, the processor 1140 may set an emergency level according to a certain criterion.

For example, the processor 1140 may set, as the emergency level, a higher one between the reference emergency level and the first emergency level. The processor 1140 may set the reference emergency level as the emergency level by giving priority to the reference emergency level over the first emergency level. The processor 1140 may set the first emergency level as the emergency level by giving priority to the first emergency level over the reference emergency level.

For example, the processor 1140 may set the first emergency level for the first image forming operation based on at least one selected from the predefined priority order of users, the predefined priority order of communication methods by which image forming operations are requested, and the predefined priority order of IP addresses for which image forming operations are requested.

For example, the processor 1140 may perform a first calibration operation corresponding to the first emergency level according to the priority order of the first image forming operation.

When a color image including a plurality of colors is printed without performing calibration, the colors of a printed color image may not reflect the colors of the original color image, and colors may not be properly aligned. Accordingly, the processor 1140 may set an emergency level for an image forming operation, taking into account characteristics of the image forming operation, and may perform a calibration mode corresponding to the emergency level.

For example, the processor 1140 may set the first emergency level for the first image forming operation based on at least one selected from the kind of the first image forming operation, a format of a file requested for the first image forming operation, a color of text included in data of the first image forming operation, and a color of an image included in the data.

For example, the processor 1140 may set the first emergency level for the first image forming operation to a certain level or a higher level when a plurality of images are included in the data of the first image forming operation or when at least two color forming operations are requested for the first image forming operation.

For example, when receiving a request to perform the first image forming operation, the processor 1140 may display information about whether to perform calibration and information about estimated time of completion of the first image forming operation through the user interface device 1120 or may transmit the information to an external device, which has requested to perform the first image forming operation, through the communication device 1110. The estimated time of completion of the first image forming operation may be the sum of a waiting time caused by performing the first calibration operation and an image forming operation time.

The processor 1140 may perform the first image forming operation after the first calibration operation is performed.

The method of operating the image forming apparatus 10, the electronic device 20, and a management device may be embodied as computer-readable storage media that store data or commands executable by a computer or a processor. The method can be written as computer programs and can be implemented in general-use digital computers that execute the programs using a computer-readable storage medium. The computer-readable storage media may be read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tape, floppy disks, magneto-optical data storage devices, optical data storage devices, hard disks, solid state disks (SSDs), or any devices that can store a command or machine readable instructions, relevant data, a data file, and a data structure and can provide the command or machine readable instructions, the relevant data, the data file, and the data structure to a processor or a computer to allow the processor or computer to execute the command.

While examples have been described with reference to particular examples and drawings, various changes and modifications may be made in the above descriptions by those of ordinary skill in the art. For example, even when the techniques described above are performed in a different order than described above, and/or the components such as systems, structure, devices, circuits, etc. described above are coupled to or combined with each other in different manners than described above or substituted or replaced with other components or equivalents, proper results may be obtained.

It should be understood that examples described herein should be considered in a descriptive sense and not for limitation. Descriptions of features within each example should be considered as available for other similar features in other examples. While examples have been described with reference to the figures, it will be understood by those of ordinary skill in the art that various changes in form and details may be made therein without departing from the spirit and scope as defined by the following claims.

What is claimed is:

1. A method of operating an image forming apparatus, the method comprising:
   receiving a request to perform an image forming operation;
   performing a calibration operation based on obtained urgency level information in response to the request, when a condition for performing a calibration is satisfied in the image forming apparatus, the urgency level indicating a level of urgency to perform the image forming operation and the calibration is to standardize color representation of the image to be formed;
   setting the urgency level of the image forming operation based on a priority order of users; and
   performing the image forming operation after the calibration operation is performed when the condition for performing the calibration is satisfied.

2. The method of claim 1, wherein a mode of the calibration operation is set according to the urgency level to,
   a time of the calibration operation to decrease as the urgency level of the image forming operation increases, or
   a skip mode, a quick mode, or a full mode, the skip mode instructing the calibration operation to be skipped when the condition for performing the calibration is not satisfied, the quick mode instructing a partial operation of the calibration operation to be performed, and the full mode instructing the calibration operation to be fully performed.

3. The method of claim 1, wherein the performing of the calibration operation based on the urgency level includes at least one selected from:
   performing a skip mode when the urgency level is set to be in a high urgency range, the skip mode instructing the calibration operation is to be skipped;

performing a quick mode when the urgency level is set to be in a low urgency range, the quick mode instructing a partial operation of the calibration operation is to be performed; and performing a full mode when the urgency level is set to be in a lowest urgency range or is not set, the full mode instructing the calibration operation is to be fully performed.

4. The method of claim 1, wherein the receiving of the request to perform the image forming operation includes receiving input level information or information to modify an urgency level based on a user's authority information from an external device or a user interface device of the image forming apparatus, the input level information is to set the urgency level for the image forming operation among a plurality of urgency levels.

5. The method of claim 1, wherein, when a preset reference urgency level in the image forming apparatus is different from a first urgency level set according to a user input requesting the image forming operation, the performing of the calibration operation based on the urgency level includes one of:

performing the calibration operation based on a higher urgency level between the reference urgency level and the first urgency level;

performing the calibration operation based on the reference urgency level by giving priority to the reference urgency level over the first urgency level; and performing the calibration operation based on the first urgency level by giving priority to the first urgency level over the reference urgency level.

6. The method of claim 1, wherein the performing of the calibration operation based on the urgency level includes setting the urgency level of the image forming operation based on a priority order of communication methods by which image forming operations are requested, or a priority order of Internet protocol (IP) addresses of the requested image forming operations.

7. The method of claim 6, wherein the performing of the calibration operation based on the urgency level further includes performing the calibration operation corresponding to the urgency level according to a priority order of the image forming operation.

8. The method of claim 1, wherein the performing of the calibration operation based on the urgency level includes setting the urgency level of the image forming operation based on a kind of the image forming operation, a format of a file requested for the image forming operation, a color of text included in data of the image forming operation, or a color of an image included in the data.

9. The method of claim 8, wherein the setting of the urgency level of the image forming operation includes setting the urgency level of the image forming operation to a predefined level or higher when a plurality of images are included in the data of the image forming operation or when at least two color forming operations are requested for the image forming operation.

10. The method of claim 1, further comprising displaying, in response to the request, first information about whether to perform the calibration operation or second information about estimated time of completion of the image forming operation when the calibration operation is performed or transmitting at least one of the first information and second information to an external device having requested to perform the image forming operation.

11. A non-transitory computer-readable storage medium storing instructions executable by a processor to:

receive a request to perform an image forming operation;

perform a calibration operation based on obtained urgency level information in response to the request, when a condition for performing calibration is satisfied in an image forming apparatus, the urgency level indicating a level of urgency to perform the image forming operation and the calibration is set to standardize color representation of the image to be formed;

set the urgency level of the image forming operation based on a priority order of communication methods by which image forming operations are requested; and perform the image forming operation after the calibration operation is performed when the condition for performing the calibration is satisfied.

12. An image forming apparatus comprising:

a communication device to communicate with an external device;

a user interface device;

a processor; and a memory storing instructions executable by the processor, wherein, by executing the instructions, the processor:

receives a request to perform an image forming operation through the external device or the user interface device, performs a calibration operation based on obtained urgency level information in response to the request, when a condition for performing calibration is satisfied in the image forming apparatus, the urgency level indicating a level of urgency of the image forming operation and the calibration is to standardize color representation of the image;

sets the urgency level of the image forming operation based on a priority order of Internet protocol (IP) addresses of the requested image forming operations; and performs the image forming operation after the calibration operation is performed when the condition for performing the calibration is satisfied.

13. The image forming apparatus of claim 12, wherein, by executing the instructions, the processor performs a skip mode when the urgency level is set to be in a high urgency range, the skip mode instructing the calibration operation to be skipped, performs a quick mode when the urgency level is set to be in a low urgency range, the quick mode instructing a partial operation of the calibration operation to be performed, or performs a full mode when the urgency level is set to be in a lowest urgency range or is not set, the full mode instructing the calibration operation is to be fully performed.

14. The image forming apparatus of claim 12, wherein, by executing the instructions, the processor sets the urgency level of the image forming operation based on a priority order of users or a priority order of communication methods by which image forming operations are requested.

15. The image forming apparatus of claim 12, wherein, by executing the instructions, the processor sets the urgency level of the image forming operation based a kind of the image forming operation, a format of a file requested for the image forming operation, a color of text included in data of the image forming operation, or a color of an image included in the data.

* * * * *